(12) United States Patent
Panas et al.

(10) Patent No.: US 11,137,591 B1
(45) Date of Patent: *Oct. 5, 2021

(54) SYSTEM AND METHOD FOR COMPACT, ADAPTIVE OPTICAL SENSOR FOR OBTAINING AREAL IMAGES

(71) Applicants: Lawrence Livermore National Security, LLC, Livermore, CA (US); Goverment of the United States, as represented by the Secretary of the Air Force, Washington, DC (US)

(72) Inventors: Robert Matthew Panas, Dublin, CA (US); Harris J. Hall, Yellow Springs, OH (US); Lavern A. Starman, Dayton, OH (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/817,213

(22) Filed: Mar. 12, 2020

(51) Int. Cl.
   *G02B 26/08* (2006.01)
   *H04B 10/60* (2013.01)
   *H04B 10/11* (2013.01)

(52) U.S. Cl.
   CPC ......... *G02B 26/0833* (2013.01); *H04B 10/11* (2013.01); *H04B 10/60* (2013.01)

(58) Field of Classification Search
   CPC ..... H04B 10/11; H04B 10/60; G02B 26/0833

USPC .......................................... 398/119
See application file for complete search history.

(56) References Cited

U.S. PATENT DOCUMENTS

| 5,900,620 | A | * | 5/1999 | Livingston | ................ | F41G 3/04 |
|           |   |   |        |            |                 | 250/203.2 |
| 8,587,686 | B1 | * | 11/2013 | Riza | ........................ | G01S 7/481 |
|           |   |   |        |      |                         | 348/222.1 |
| 9,325,947 | B2 | * | 4/2016 | Bridge | .................... | H04N 5/232 |
| 10,700,779 | B1 | * | 6/2020 | Panas | ................... | H04B 10/503 |
| 2013/0208082 | A1 | * | 8/2013 | Williams | ........... | H04N 5/22541 |
|             |    |    |        |          |               | 348/36 |
| 2019/0011885 | A1 | * | 1/2019 | Durr | ................... | G02B 27/0933 |
| 2020/0142062 | A1 | * | 5/2020 | Bartlett | ................ | G01S 7/4817 |

* cited by examiner

Primary Examiner — Dalzid E Singh
(74) Attorney, Agent, or Firm — Harness, Dickey & Pierce, P.L.C.

(57) ABSTRACT

The present disclosure relates to an imaging system which may make use of an electronic controller, a digital micromirror array, an aperture control system and a detector to image a desired scene. The digital micromirror array has a plurality of micromirror elements responsive to control signals generated by the electronic controller for electronically aiming the micromirror elements in a desired direction to image the desired area, and for receiving and reflecting light emanating from the desired area. The aperture control system receives light reflected from the digital micromirror array and passes a predetermined subportion of the received light therethrough. The detector is responsive to the predetermined subportion of light.

20 Claims, 11 Drawing Sheets

Perfect Alignment

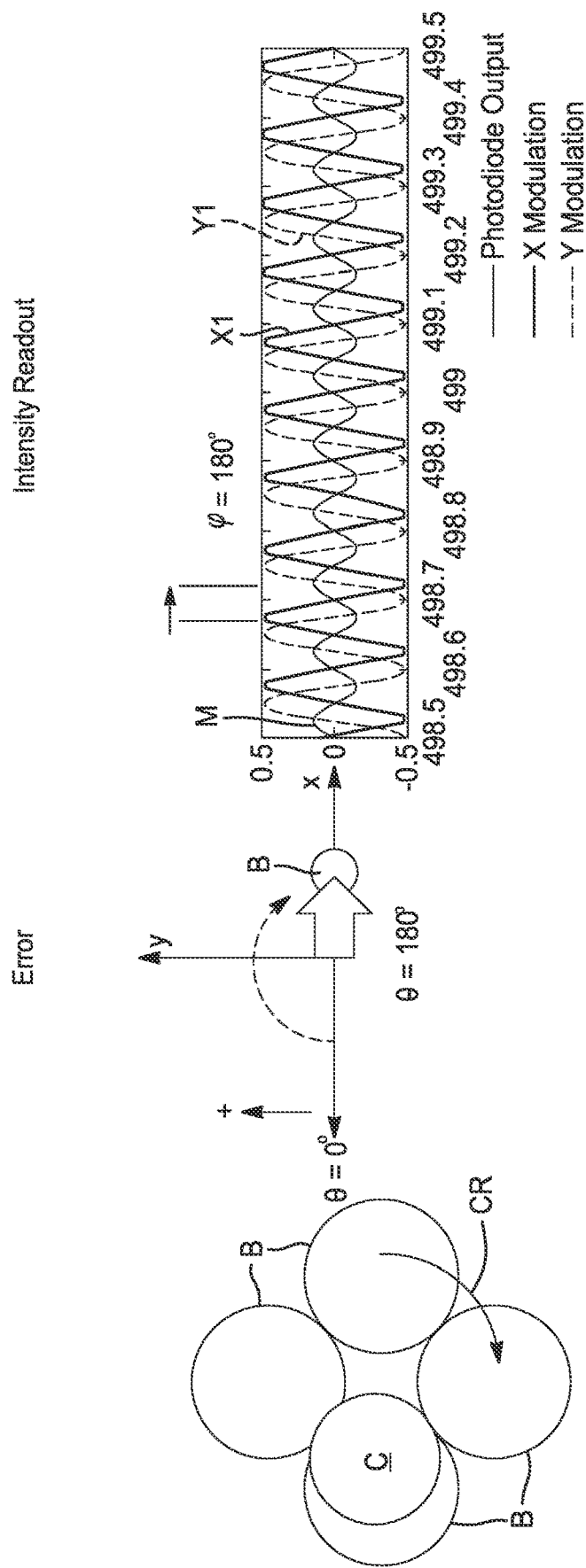

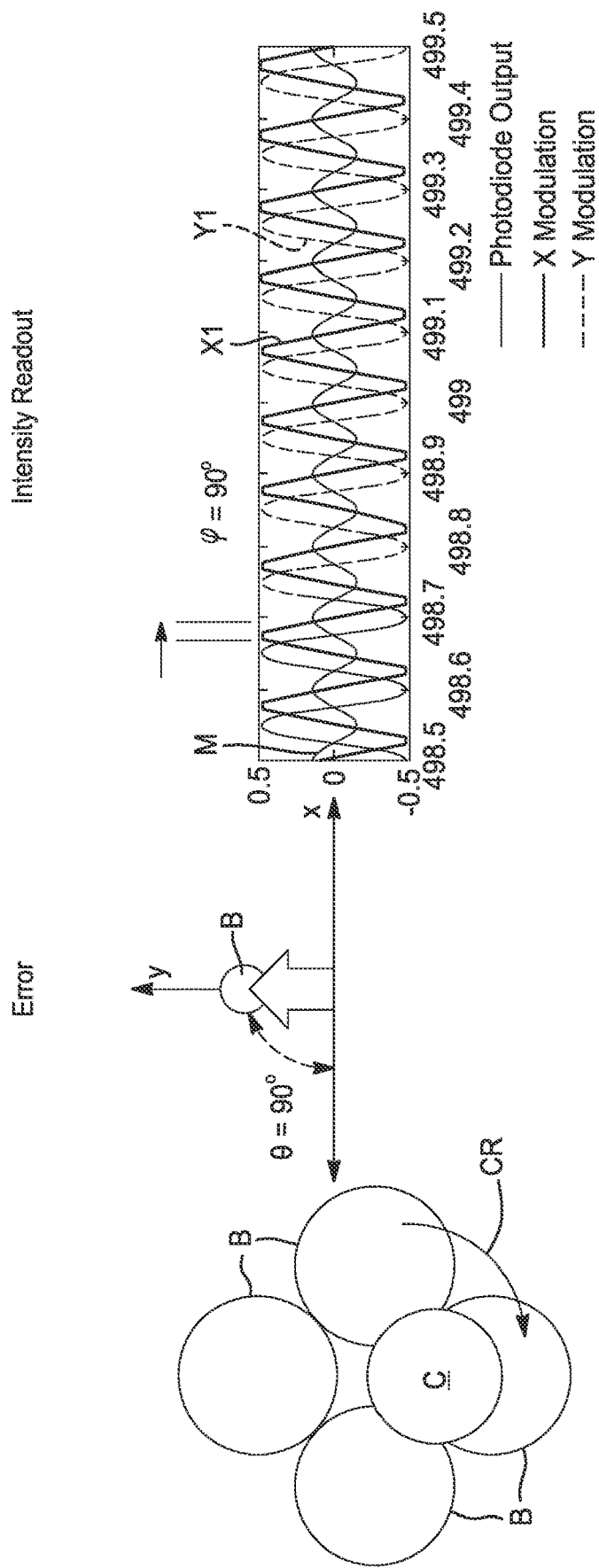

SYSTEM AND METHOD FOR COMPACT, ADAPTIVE OPTICAL SENSOR FOR OBTAINING AREAL IMAGES

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to optical sensors and methods therefor, and more particularly to a compact, adaptive optical sensor and method which is well suited for obtaining areal images in real time in noisy environments as well as when implemented on a moving platform.

BACKGROUND

The statements in this section merely provide background information related to the present disclosure and may not constitute prior art.

The interest and use of optics-based systems in connection with various technologies and applications is growing rapidly, particularly in view of self-driving vehicles and remotely controlled mobile airborne platforms. Such applications require quick and reliable real time imaging of surroundings, both for navigation purposes as well as other purposes, such as surveillance and reconnaissance tasks.

However, present day optical system face a number of operational limitations. Such present day optical systems often require the use of a mechanical gimbal for steering an optical beam of the optical system. While gimballed optics are excellent for imaging in benign environments, they are less effective when placed in high noise environments. Gimbal-based optics also tend to be high in "SWaP" (Size, Weight and Power), thus restricting their use in some implementations where a lightweight, compact, low power optical imaging system is required.

Individual micro-scanners (also known as single element micromirrors) tend to be better at handling rapid scans or adjustments needed for high noise environments, but lack the aperture to collect images in low light conditions. Present day non-gimballed optics are also limited in their steering range and resolution.

While still other technologies exist for image capture, all have difficulty or limitations in working in SWaP constraints and in high mechanical noise environments.

In view of these limitations in present day optical imaging systems, there is a strong interest in providing a gimbal-less optical imaging system and method which is ideally suited for noisy environments, and yet which is capable of obtaining high quality real time images in low light conditions. There is further a strong interest in providing such a system and method that can be constructed in a highly compact, low weight configuration, which is power efficient, and therefore meets the SWaP requirements of many present day applications. Furthermore, there is a strong interest in providing an optical imaging system which works within SWaP constraints and is well suited for use on moving platforms such as airborne mobile platforms, land based vehicles and marine vessels.

SUMMARY

This section provides a general summary of the disclosure, and is not a comprehensive disclosure of its full scope or all of its features.

In one aspect the present disclosure relates to an imaging system. The imaging system may comprise an electronic controller, a digital micromirror array, an aperture control system and a detector. The digital micromirror array may be configured to image a scene, and may include a plurality of micromirror elements responsive to control signals generated by the electronic controller. The micromirror elements may be electronically controlled so as to be aimed in a desired direction to image a desired area, and may also operate to receive and reflect light emanating from the desired area. The aperture control system may be configured to receive light reflected from the digital micromirror array and to pass a predetermined subportion of the received light therethrough. The detector is responsive to the predetermined subportion of light.

In another aspect the present disclosure relates to an imaging system comprising an electronic controller, a digital micromirror array, an electronically controlled dynamic field stop, and a detector. The digital micromirror array is responsive to scanning control signals from the electronic controller and configured to image a scene. The digital micromirror may include a beam steering circuit and a plurality of independently controllable micromirror elements responsive to micromirror tilt control signals generated by the beam steering circuit, which control the micromirror elements to electronically aim the micromirror elements in a desired direction to image a desired area, and to receive and reflect light emanating from the desired area. The electronically controlled dynamic field stop system is responsive to the electronic controller and configured to receive light reflected from the digital micromirror array, and further to present an aperture of a predetermined dimension to enable passing of only a predetermined subportion of the received light therethrough. The detector is responsive to the predetermined subportion of light.

In still another aspect the present disclosure relates to a method for imaging a scene. The method may comprise providing an electronic controller, and using a digital micromirror array including a plurality of tiltable micromirror elements responsive to control signals generated by the electronic controller for electronically aiming the micromirror elements in a desired direction to image the scene, and for receiving and reflecting light emanating from the scene. The method may further include using an aperture control system configured to receive light reflected from the digital micromirror array and to pass a predetermined subportion of the received light therethrough. The method may further include using a detector responsive to the predetermined subportion of light to detect information about the scene from the predetermined subportion of light.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings, in which:

FIGS. 6a-6c illustrate a misalignment of the detector of a receiving CAFSOC system unit along the X-axis during the spinning lock operation;

FIGS. 7a-7c illustrate a misalignment of the detector of a receiving CAFSOC system unit along the Y-axis during the spinning lock operation;

DETAILED DESCRIPTION

Example embodiments will now be described more fully with reference to the accompanying drawings.

The present disclosure is directed to new systems and methods for miniaturizing free space optical communications hardware, as well as significantly improving communications link robustness in dynamic conditions and challenging environments, as well as in inclement weather conditions. This systems and methods described herein draw on the use of high performance beamsteering micromirror arrays to reduce system size and complexity while improving link reliability performance.

Figure 1:
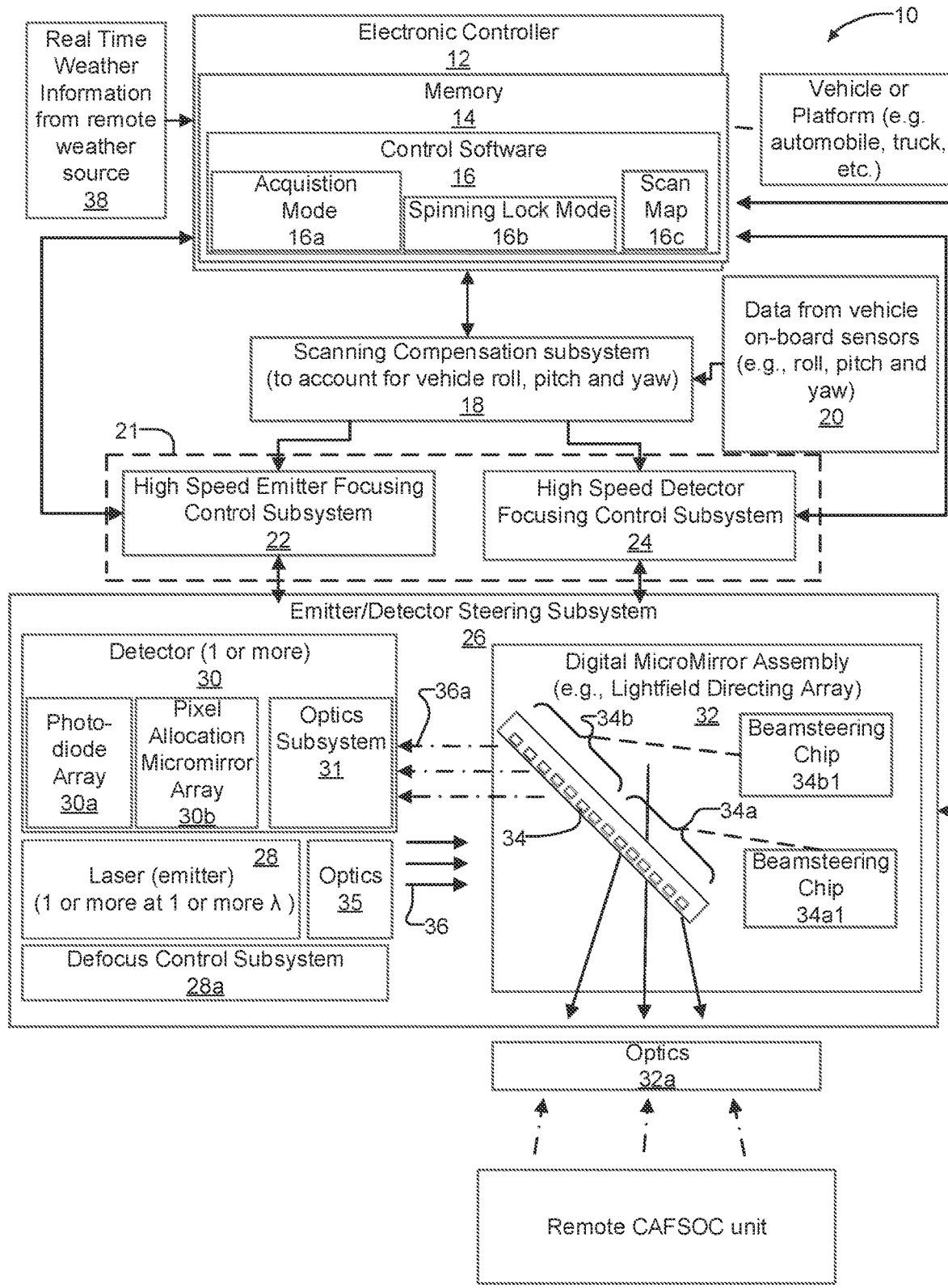
FIG. 1 is a high level block diagram of one embodiment of a compact adaptive free-space optical communications (CAFSOC) system in accordance with one embodiment of the present disclosure.

Referring to FIG. 1, one embodiment of a low-cost, high reliability Compact Adaptive Free-Space Optical communications (CAFSOC) system 10 (herein after simply "CAFSOC system 10") is shown in FIG. 1 in accordance with one embodiment of the present disclosure. The CAFSOC system 10 is enabled by a Free-Space Optical Communications (FSOC) subsystem which makes use of advanced digital micromirror array beamsteering chip technology. The advanced, digital micromirror array beamsteering chip technology may be formed by, for example, the Lightfield Directing Array ("LDA") developed by the assignee of the present disclosure, which employs closed loop feedback, and which is disclosed in U.S. Patent Pub. No. US 2018/0180872A1, published Jun. 28, 2018, the entire disclosure of which is hereby incorporated by reference into the present disclosure. While the FSOC subsystem could be enabled by any array beamsteering chip technology with sufficient performance, the LDA is expected to be a highly preferred subsystem due to its present performance advantages. The beamsteering technology provided by the LDA offers the potential to help form low cost CAFSOC communications links that can maintain signal lock even when operating in challenging operating/geographic/environmental conditions.

The CAFSOC system 10 offers a significant reduction in size, weight and power (SWaP) as it uses a smaller laser source and avoids the need for gimbal-mounted optics. The system 10 can also maintain tracking lock in the rough and adverse of conditions of turbulence, shock, acceleration, thermal variation, turbulence and vibration, as found on mobile platforms.

An agile precision pointing system like the CAFSOC system 10 offers a new route to break the conventional paradigm and achieve the best of both types of systems (directional and omnidirectional); consistent lock with low power and LPI/LPD performance while bypassing the typical size/cost limitation. The large angle range of the beamsteering chip enables it to replace conventional steering mirrors and gimbal setups with an IC micro-fabricated mass production chip. This cuts out the majority of the size, cost and maintenance issues. The capability of the chip to move at extremely high speeds with closed loop control around integrated sensing allows the system 10 to manage the disturbances that would normally break lock and lose the link. Links can then be reliably set up over multiple kilometers in good weather conditions.

The CAFSOC technology employed with the CAFSOC system 10 is intended to maintain pinpoint tracking even in high-disturbance conditions which would break laser lock even on state-of-the-art systems, and furthermore to do so with far less beam jitter than previously developed beam pointing systems.

In FIG. 1 one CAFSOC system 10 "unit" is shown. It will be appreciated that the present disclosure preferably involves the use of two CAFSOC system 10 units. Each CAFSOC unit 10 includes a main system electronic controller 12 (hereinafter simply "controller" 12), having memory 14 included or accessible to it. The memory 14 may be a non-volatile memory such as, for example and without limitation, non-volatile RAM or ROM, and may contain control software 16 for helping to control aiming of a laser beam from the CAFSOC system as well as real time interpreting/detecting of objects within an imaged scene, and distances to such objects. The control software 16 includes a plurality of software submodules for implementing adaptive operating modes. A first such mode is a "Scanning Acquisition" mode 16a, which includes software which enables the CAFSOC system 10 unit to quickly initially detect and acquire a signal from another remotely located CAFSOC system unit. A second operating mode is a "Spinning Lock" mode 16b which includes software to enable the CAFSOC system 10 unit to perform a highly accurate, fine alignment operation to substantially perfectly lock on to a received signal from a remote CAFSOC system unit. These two operating modes will be described in greater detail in the following paragraphs. However, it will be appreciated that the present CAFSOC system 10 and method is not limited only to modes 16a and 16b, and that other modes, which may possibly include different combinations of modes 16a and 16b with other modes, are within the scope of the present disclosure.

The controller 12 may receive information from a scanning compensation subsystem 18 to account for platform movement, such as elevational position changes of the vehicle, roll, pitch, yaw, etc. The scanning compensation subsystem 18 generates the information from raw data received from vehicle on-board sensors 20 (e.g., gyroscope(s), roll sensor, pitch sensor, yaw sensor, etc.). Any sensing gaps (e.g. lack of gyros in a vehicle) in the vehicle on-board sensors can be supplemented with sensors included in the CAFSOC system. And while the CAFSOC system 10 is expected to find particular utility in connection with highly mobile platforms like cars or personnel, CAFSOC system 10 is also usable with a wide variety of other types of vehicles, for example marine vessels, aircraft, spacecraft, remotely controlled drones, and even earth moving equipment, off road vehicles (ATVs), or railway vehicles (e.g., trains). The scanning compensation subsystem 18 communicates scanning compensation data to a high speed focusing control subsystem 21 which may include a high speed emitter focusing control subsystem 22 (hereinafter simply "emitter focusing subsystem" 22), as well as a high speed detector focusing electronic control subsystem 24 (hereinafter simply "detector focusing subsystem" 24). The emitter focusing subsystem 22 generates control signals. Emitter focusing subsystem 22 and detector focusing subsystem both communicate bidirectionally with an emitter/detector steering subsystem 26, which generates one or more laser beams out to neighboring CAFSOC system 10 units and receives back optical signals from one or more CAFSOC system units in the area.

The emitter/detector steering subsystem 26 may include one or more lasers 28 and a detector 30 having a photodiode array 30a comprised of one or more light sensors, which in this example are in the form of photodiodes. For convenience, the laser 28 will be described as generating a single laser beam, although the present disclosure may just as readily be used with a plurality of independently controllable lasers that generate a corresponding plurality of laser beams. If a plurality of independently lasers are used, the beams may be of a common wavelength, or different wavelengths, each possibly selected based on providing optimal transmission through particular kinds of weather or environment.

The emitter/detector steering subsystem 26 may also include an optics subsystem 31, and a digital micromirror assembly 32. The digital micromirror assembly 32 may have a plurality of independently, digitally controllable micromirrors 34 which can be used to reflect the entire laser beam 36 generated by the laser 28. The laser beam 36 emitted from the digital micromirror assembly 32 passes through an optics subsystem 35 prior to reaching the micromirrors 34, through an optics subsystem 32a toward a scene being viewed. A dynamically variable field stop 30d is also preferably incorporated in the detector 30.

The digital micromirror assembly 32 also operates to reflect received light signals back to the detector 30 through the optics subsystem 31. In this regard, it will be appreciated that one group of the micromirrors 34, for example indicated by reference number 34a, functions as an "emitter array" to control the direction of emitted light from the laser 28 toward the scene being imaged laser, while a different group of the micromirrors 34, for example designated by reference number 34b, may function as a "detector array", which may be used to reflect received light signals into the detector 30. The digital micromirror assembly 32 also importantly includes a first beamsteering chip 34a1 for controlling the positioning of each of the micromirrors in the emitter array 34a, while a second beamsteering chip 34b1 may be used to control the micromirrors 34 in the detector array 34b. In another embodiment, a single beamsteering chip may be used to control the micromirrors in both the emitter array 34a and the detector array 34b. Both implementations are contemplated by the present disclosure.

In one implementation the digital micromirror assembly 32 uses individual ones of the micromirrors 34 or subgroups of the micromirrors 34 to reflect different portions of the laser beam 36 (or even separate laser beams if more than two lasers are being used) toward two or more specific remote CAFSOC system units in the scene, and to reflect received optical signals 36a from the two or more CAFSOC system units back into the detector 30. The digital micromirror assembly 32 thus makes it possible to closely track two or more objects within a given scene simultaneously in real time.

The digital micromirror assembly 32 also collects reflected optical energy back from the scene being imaged, or from specific subregions or objects within the scene, and provides data corresponding to the received optical signal to the detector 30. Again, the detector 30 may be a single light detector or an array of independent light detectors, with one embodiment shown in FIG. 1 having the photodiode array 30a. The emitter/detector subsystem 26 reports the collected data back to the controller 12 which uses the control software 16 to quickly acquire signals from one or more other CAFSOC system units and to fine tune the DMM assembly 32 to substantially perfectly lock on to the received signal.

One possible configuration of the arrays 34a and 34b of the digital micromirror assembly 32 is rather to use a single array for both emission and detection steering, so they are using a common window. This requires a means to separate the returning light from the emitted light, which is done generally in one of two ways. In the first way, the apertures are of significantly different size, so one can form a small part of another while being co-aligned. For example, the laser beam 36 is reflected off a small mirror at the center of the collection aperture. Unfortunately, for MEMS, the aperture size is the major cost factor, and the performance scales by the product of the two apertures, emitter and receiver. So mismatching the size reduces performance while increasing cost. Matching the aperture sizes generally provides the highest return signal capture for the lowest cost. In the second way, a beamsplitting optic is used to partially reflect some of the return beam to the detector. The ideal beamsplitting value is generally roughly 50:50 splitting. Unfortunately, this attenuates the outgoing signal and the return signal, meaning approximately 4× the power is required. The increased power directly raises the cost of the emitter. From a practical view, the stray light from putting both onto a common array and having both go through a common window causes significant technical challenges. This is because even the fractional stray light returns from the shared optical path are often enough to swamp the detector reading, since it can be around six orders of magnitude lower than the emitted pulse. There will be windows, one on the mirror chip and one on the housing, and the external faces of the housing window will never be free of scattering objects. A separate window and optical path for emission vs detection avoids this signal cross-talk and lowers emitter power demands and sensor performance demands. The shared window can be implemented but another system using separated arrays/windows will win on cost hence margin, simplicity, manufacturability and performance. So while the present CAFSOC system 10 may operate with a common array and window, one preferred layout is with separate arrays and windows.

The emitter and detection arrays 34a and 34b may have additional optical elements (31, 35, 32a) including lenses, angle magnification elements and area magnification elements placed before or after them. It is generally best practice to use a similar set of optics for both arrays, so they have matched optical capabilities (angular range, etc.) in order to do parallel tracking. For instance, angle magnifying lenses may be placed in front of both (32a) to increase the angular throw of the CAFSOC system 10. This has the effect of increasing resolution and beam size on target, but the tradeoff may be worth it in many cases.

The CAFSOC system 10 provides the advantage that the light detecting sensor 30 may be operated in an adaptive mode by using different ones of the micromirrors 34 of emitter array 34a to control steering of the beam(s) from the laser beam 36 as well as to selectively direct different ones of the received (i.e., reflected) light signals back into the detector 30. In general, it would be desirable to match the array size of the micromirrors 34 used with the detector array 34b to the array size of the micromirrors 34 used with the emitter array 34a to emit the laser beam 36, so as to have a 1:1 mapping for laser 28 (i.e., the emitter) and the detector 30, but this is not strictly required. For example, the detector array 34b could be made larger than the emitter array 34a to capture more return light. The detector array 34b, or just a portion thereof, may then be steered to capture returns from any given area in the field-of-view, or possibly two or more given areas simultaneously. Splitting the receiver would allow for the CAFSOC system 10 to maintain communication lines with more than one other CAFSOC system node simultaneously. Both the emitter and receiver could be split to maintain transmit and receive capabilities out to two or more other CAFSOC system units. The ability to focus a part (or the whole of) the receiver array on a single spot will significantly reduce noise by rejecting light from all other directions but the small targeted field of view for each sensor of the detector 30. The detector 30 adaptively maps the incoming light 36a to a plurality of photodiodes within it by the use of a pixel allocation digital micromirror array 30b inside the detector 30. This process is described below. The detector array 34b could be slaved so that the detector array 34b effectively "tracks" the emitter array 34a once locked on to another CAFSOC system 10 unit, producing an optical imaging system that is both emitting to a particular direction and only sensing in that particular direction. The benefit of this configuration is significantly reducing interference in the detector 30, thus significantly improving the signal-to-noise ratio. If higher sensing capability is desired for a particular beam, multiple detector array 34b micromirror elements could be pointed at the same angle to proportionally increase the captured signal. Likely, leaving each detector array 34b micromirror 34 steering element slaved to a corresponding emitter array 34a micromirror element will still provide good performance, as the increase in signal would also be generally accompanied by pointing more of the emitter array 34a micromirror elements 34 at the point of interest too. In general, the detector micromirror array 34b and the emitter micromirror array 34a act to bring a particular area of the field-of-view into regard by the CAFSOC system 10, similar to a laser telescope and sensor telescope working in parallel to focus on another CAFSOC system 10 unit. By approximately slaving the detector 34b and emitter 34a micromirror arrays together, the CAFSOC system 10 is able to maximize the signal-to-noise ratio even if the beam is split and communication is parallelized by using multiple separate output beams. This is because the signal-to-noise is approximately driven by the product of the emitter area and the detector area, so the highest product for the least number of mirrors is to have the two aperture sizes equal. The acceptance angle of each detector array 34b micromirror element 34 could be made slightly wider than the expected emitter beam (i.e., beam 36) size so as to still capture the full emitted laser beam signal, even if the emitter array 34a and detector array 34b are slightly misaligned. This acceptance angle parameter would be largely constrained by the design of the detector 30, described below. However, the tradeoff is that the larger this acceptance angle is, the higher the background noise is likely to be.

Figure 2:
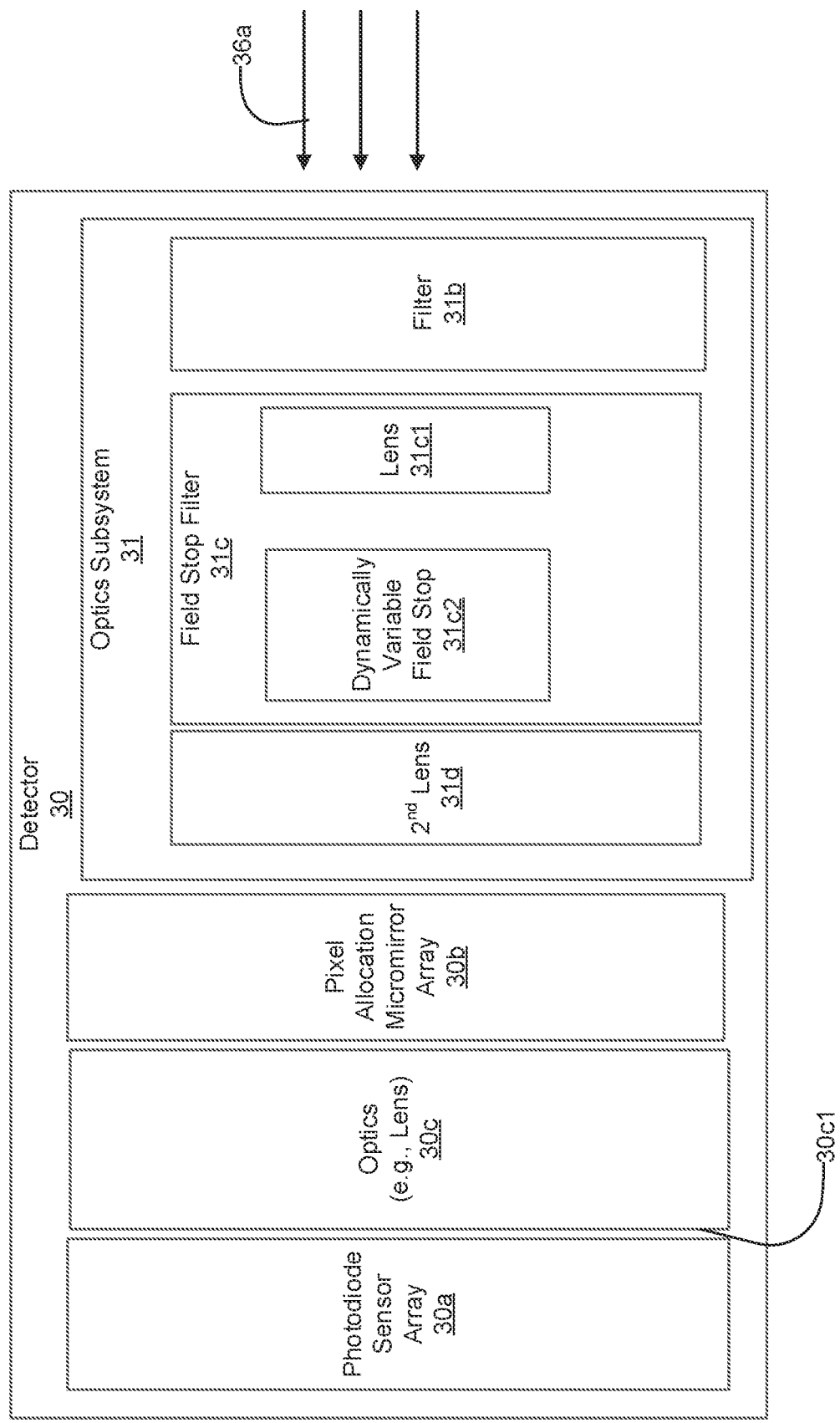
FIG. 2 is a high level block diagram of one example of a construction of the detector which may be used with the system.

The detector 30 maps the light captured by the detector micromirror array 34b to the photodiodes of the photodiode sensor array 30a within it. It is often desired to use a small photodiode with the highest possible signal on it to improve signal collection capability. This requires that all light 36a being received from a specific communication pulse be focused down to a single area that may be smaller than the size of the steering mirrors in the digital detector micromirror array 34b. The size of the diode controls noise for some types of diodes (PIN), and the detector 30 response time, which is important for observing short nanosecond scale pulses characteristic of communications returns. Each independent beam sent out by the CAFSOC system 10 unit emitter/detector steering subsystem 26 will generally also have a return beam from the communications unit (i.e., the other CAFSOC system 10 unit) at the other end, which will be captured by the corresponding slaved section of the detector micromirror array 34b, and all the return signal associated with that pulse should be focused to a single photodiode pixel (i.e., one of the photodiodes in the photodiode sensor array 30a in FIG. 1) if possible to minimize noise. However, minimizing noise presents two difficulties. First, the distribution of the detector micromirror array 34b area is adapting rapidly to capture the returns from one or more emitted beams so it cannot be predetermined. The layout of the light directing systems 31 and 30b within the detector 30 to focus the incoming light 36a to the photodiodes 30a must then also be adaptive. Second, there is an issue of environmental background noise including stray light from other nearby communications units pulled in by the sensors, or unwanted efforts to blind the sensor (i.e., photodiode). It is desired that the detector sensors (i.e. photodiodes of the photodiode sensor array 30a) only receive light from each mirror element 34 in the detector array 34b corresponding to the direction of interest that the mirror element is pointing. However, mirrors will also pass light into the system from all other angles, which can get read in to the photodiodes 30a of the photodiode sensor array 30a causing environmental noise, if not filtered out. This is a particular issue with solar reflection or sensor crosstalk if other communications units are operational in the area, as would be expected for nearby nodes in a network. The desired incoming communication light is all leaving the emitter/detector steering subsystem 26 detector micromirror array 34b as a parallel set of beams 36a, while the unwanted light will be reflected off the mirrors at non-zero angles corresponding to other locations in the field of view. There is therefore a need to filter this off-axis light for both the wavelengths of interest and to remove the unwanted environmental noise returns. The design in FIG. 2 shows one way both of these goals may be accomplished. The signal 36a from the digital micromirror assembly 32 is fed into the detector 30. First, the light is filtered by a filter 31*b* to reduce returns corresponding to wavelengths other than the wavelengths used by the CAFSOC system 10. Second, a standard field stop filter 31*c* is used to block the angular component of the captured light. This can work by using a lens 31*c*1 to focus the light to an image plane. A dynamically variable field stop (i.e., blocking filter with controllable sizable aperture) 31*c*2 is placed on the image plane, and controlled by the control software 16, to controllably vary the area through which light may be received. All light leaving the detector micromirror array 34*b* at undesired angles will get mapped to other locations on the focal plane, and be blocked by the dynamically variable field stop 31*c*2. A second lens 31*d* returns the light back to a roughly collimated beam, which is pointed at the internal pixel allocation micromirror array 30*b*. It will also be appreciated that the internal pixel allocation micromirror array, in some applications, may not be necessary. However, it may be used in some applications, for example if one wanted to combine light captured from multiple elements on the original array 34*b* onto the same portion of the photo-diode detector array 30*a*. Thus, the internal pixel allocation micromirror 30*b* may not be needed unless one is trying raise the SNR locally, but the losses inherent to inserting the internal pixel allocation micromirror array 30*b*, in some applications, may outweigh the benefit of including it.

The lenses 31*c*1 and 31*d* may additionally be used in a standard image transfer setup where the detector micromirror array 34*b* is considered the input image plane. The lenses would then pass the image through the dynamically variable field stop 31*c*2 and reimage it to the pixel allocation micromirror array 30*b*. The defocus control subsystem 28*a* may also play a role in re-imaging the image to the pixel allocation micromirror array 30*b*. This is often done with a 4-*f* optical setup, which does not magnify the image. While the pixel allocation micromirror array 30*b* does not need to be the same array size as the detector micromirror array 34*b*, it is generally best practice and the most flexible layout to make them equal. Then each mirror on the detector micromirror array 34*b* is mapped to a mirror on the pixel allocation micromirror array 30*b*. The pixel allocation micromirror array 30*b* takes the collimated light incident on it and distributes that light to the array of photodiodes of the photodiode sensor array 30*a*, which record the light pulse. The distribution process is carried out by steering the light through a lens 30*c* which maps angle to displacement of the focal point on the image plane. In this example the detector sensor array 34*b* is located on the image plane 30*c*1 of the lens 30*c*, so as the mirrors on the pixel allocation micromirror array 30*b* change the emitted angle of the light, that light focuses down to a different spot on the photodiode sensor array 30*a*. The benefit of using the lens 30*c* is that the focal point on the photodiode sensor array 30*a* is much smaller than the beam size at the pixel allocation micromirror array 30*b*. This allows for smaller detector sensor pixels to be used, which reduces sensing noise and reduces sensor response time. Each emitted beam 36 will generally have one pixel used to capture the return pulse 36*a* to minimize noise, so the photodiode array 30*a* is sized largely by the expected degree of parallelization. It is expected that a small array of <10 photodiodes are generally sufficient.

Figure 3:
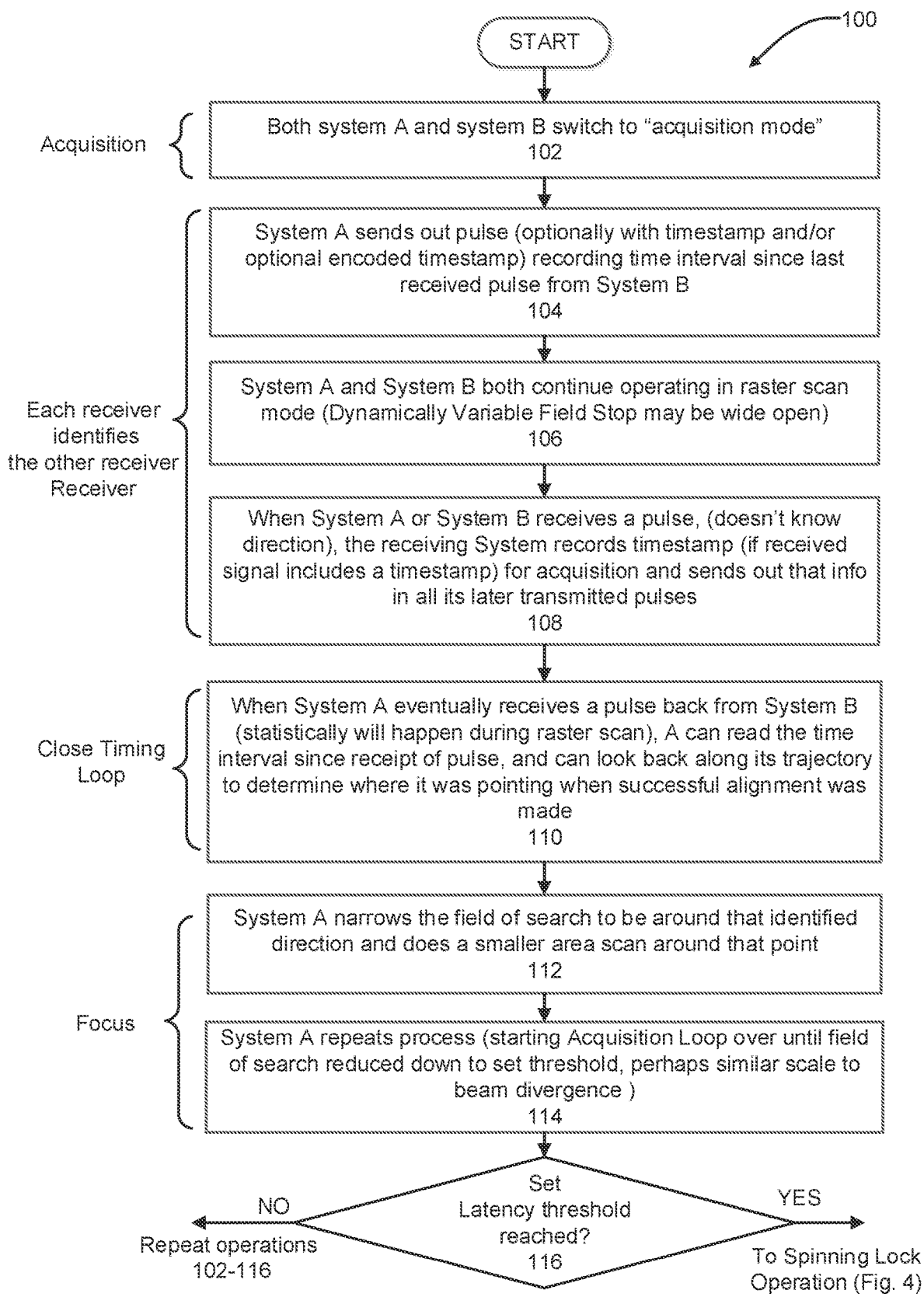
FIG. 3 is a flow chart illustrating one operational sequence that the system may be used to initially acquire a communications link with another remote CAFSOC system.
Figure 4A:
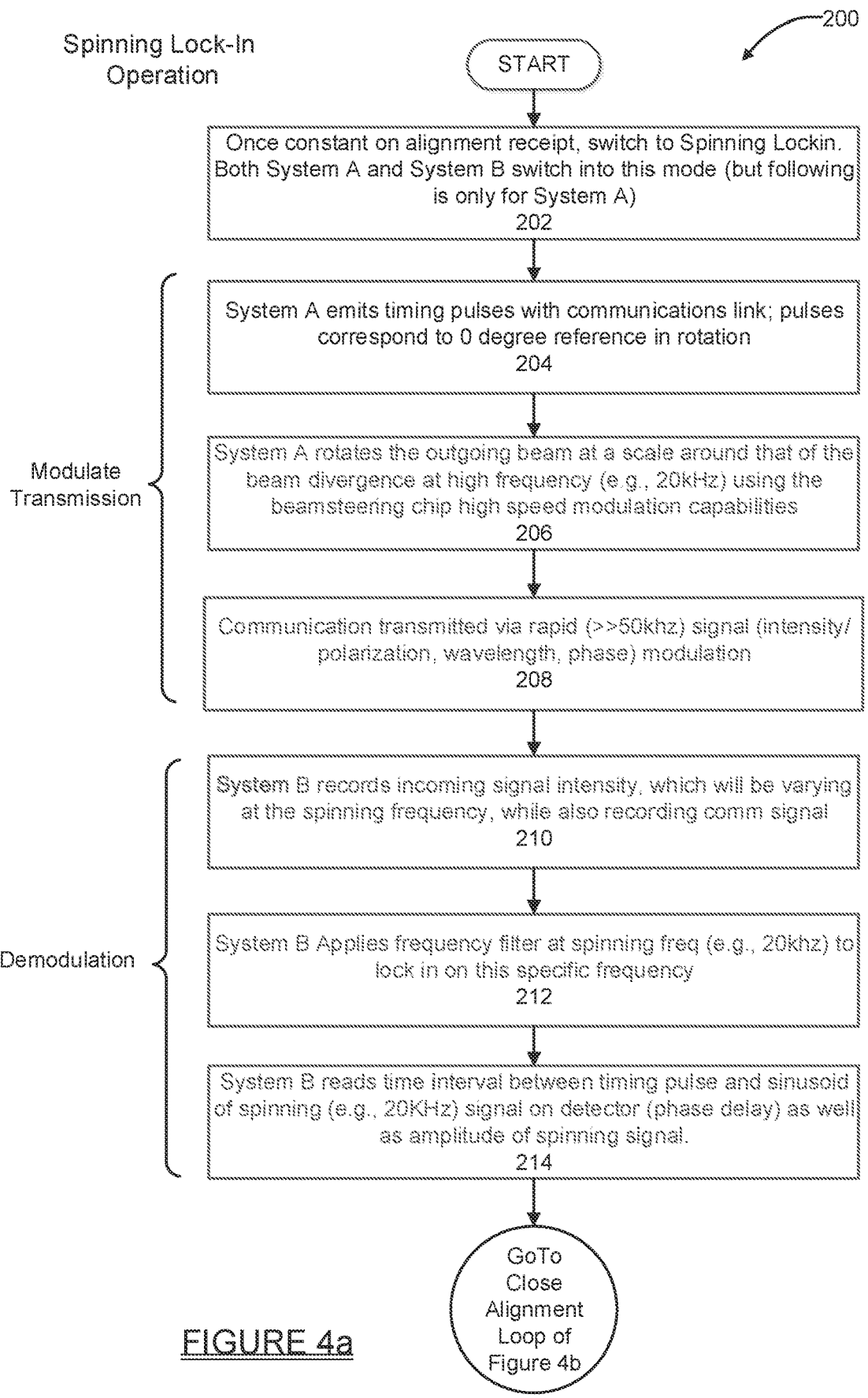
FIGS. 4a and 4b show flowcharts of operations performed by two CAFSOC system units in modulating and demodulating transmissions to initially acquire, lock on, close and focus signals being exchanged between the two CAFSOC units.

Referring to FIGS. 3, 4 and 4*a*, one example of the operational sequence of using the CAFSOC system 10 is shown. Referring initially to FIG. 3, just before entering the acquisition mode, both of Systems A and B will be pointing at specific locations (i.e., along specific vectors) while looking broadly. At operation 102 System A and System B both switch into the acquisition mode which is implemented using the acquisition mode software 16*a*. The acquisition mode is intended to robustly bring two CAFSOC system 10 units into direct alignment, even in dynamic conditions (e.g., where one or both are moving or other environmental conditions are rapidly changing). For the purpose of describing the operations being performed in FIGS. 3 and 4, one CAFSOC system 10 unit will be referred to simply as "System A" and the other will be referred to simply as "System B".

At operation 104 System A sends out an optical pulse (i.e., a "ping") optionally with a timestamp recording time (which may optionally also be encoded) since the last received pulse from System B. If System A has not received a pulse from System B yet, then no timestamp is included. As this operation is repeated by System A, it records the vector that the transmitter signal was sent along using its scan map 16*c*. At operation 106, System A and System B both continue operating in a raster scan mode, in other words in a back-and-forth scanning pattern looking for a pulse from the other. When System A or System B detects a pulse (the specific originating vector being unknown), the receiver of the receiving System records the time of acquisition, and now sends out a timestamp corresponding to the amount of time that has passed since the time of acquisition. That timestamp is sent out in all of its later transmitted pulses, as indicated at operation 108. When System A eventually receives a pulse back from System B (statistically this will happen eventually during raster scanning by System A's receiver), System A can read the time interval since System B received a pulse from System A, and System A can look back along its trajectory using its scan map 16*c* to determine exactly where it was pointing (i.e., the pointing vector) when successful alignment was made, as indicated at operation 110. At operation 112, System A then narrows the field of search to be around that previously identified direction and does a smaller area scan around that that specific point (i.e., around that specific vector associated with the transmitted pulse that produced a response from System B). By "smaller scan area", System A may zoom in by a factor of, for example 2-10, to create a significantly smaller field of view. The scan continues widening up from the specified point until a return signal is received noting a new contact made with System B. At operation 114, Systems A and B both repeat the above operations 104-112 until the field of search is reduced to a set threshold, perhaps similar in scale to the beam divergence.

Systems A and B, which are both performing the above-described operations during the acquisition mode, will iterate to proximate alignment quickly (e.g., typically within about 0.1 seconds). The time interval between receipt of pulses by each of Subsystem A and Subsystem B will drop rapidly as alignment is achieved. During acquisition, System A needs to be able to look and emit light over a wide field of view to be ready to record the incoming signal from System B and time stamp it. There are several methods that could be employed to even further aid in improving the field of view of the receiver (detector) 30 of each of System A and System B, and these could be done individually or together. First the detector 30 of each of System A and System B could use a fish eye lens type setup in the optics 32*a* that can capture light from a wide range of directions. Second, System A (or more preferably both System A and System B) could modulate the dynamically variable field stop 31*c*2 in its detector 30 in order to widen the field of view for each of the sensors 30*a*. Third, the beamsteering chip 34*b*1 could be commanded to have each of its associated elements 34 point in a different direction, meaning the beamsteering chip would essentially act as a convex mirror to provide a wide field of view. Fourth, one of the sensors 30a could be a camera chip, which could be used during the defocused operation to provide an estimate of the location of the emitter (i.e., System B), as compared to a single pixel 34 which cannot provide any location information. The net effect of all of these would be to widen the field of view of capture so the transmission from each of System B and System A can be received by the other regardless of their locations. Once the location of System B is known by System A via the acquisition process aligning to a specific orientation, the receiver (detector) 30 of System A can switch from a wide field of view mode to a narrow field of view around that just-identified direction, as indicated at operation 112, to lock-in by using the alignment information provided by the emitter array 34a. This will shift the link to a more robust, jam-resistant mode. The use of a camera chip as one element of the detector sensor array 30a allows the receiver (detector 30) to begin focusing in on the source point before the emitter focusing control subsystem 22 is locked in fully. At operation 116 System A makes a check if the field of search has been narrowed down to returns occurring at a predetermined set narrow time latency threshold, for example a few milliseconds. The predetermined narrow threshold before getting a return signal may also be an angle, for example, the beam scan (working in a spiral pattern from the point of last alignment) reaches an angle scale equal to the divergence of the received beam. A check is then made at operation 116 to determine if the predetermined, set latency threshold has been reached, and if not, then operations 102-116 are repeated. If the check at operation 116 indicates that the predetermined latency threshold has been reached, then the spinning lock control routine may be executed. Again, it will be appreciated that with System B preferably performing operations 110-114 as well, the iteratively process is significantly improved; essentially Systems A and B working together can cut the time needed to reach the latency threshold by 50% or more.

The spinning lock operation is set forth in flowchart 200 of FIG. 4. Initially at operation 202, both of Systems A and B switch into this mode of operation, although certain ones of the operations set forth in FIG. 4 reference just System A, it will be appreciated that System B is performing the same operation. In effect System B is substantially simultaneously performing the same operations.

Figures 5A, 5B, 5C:
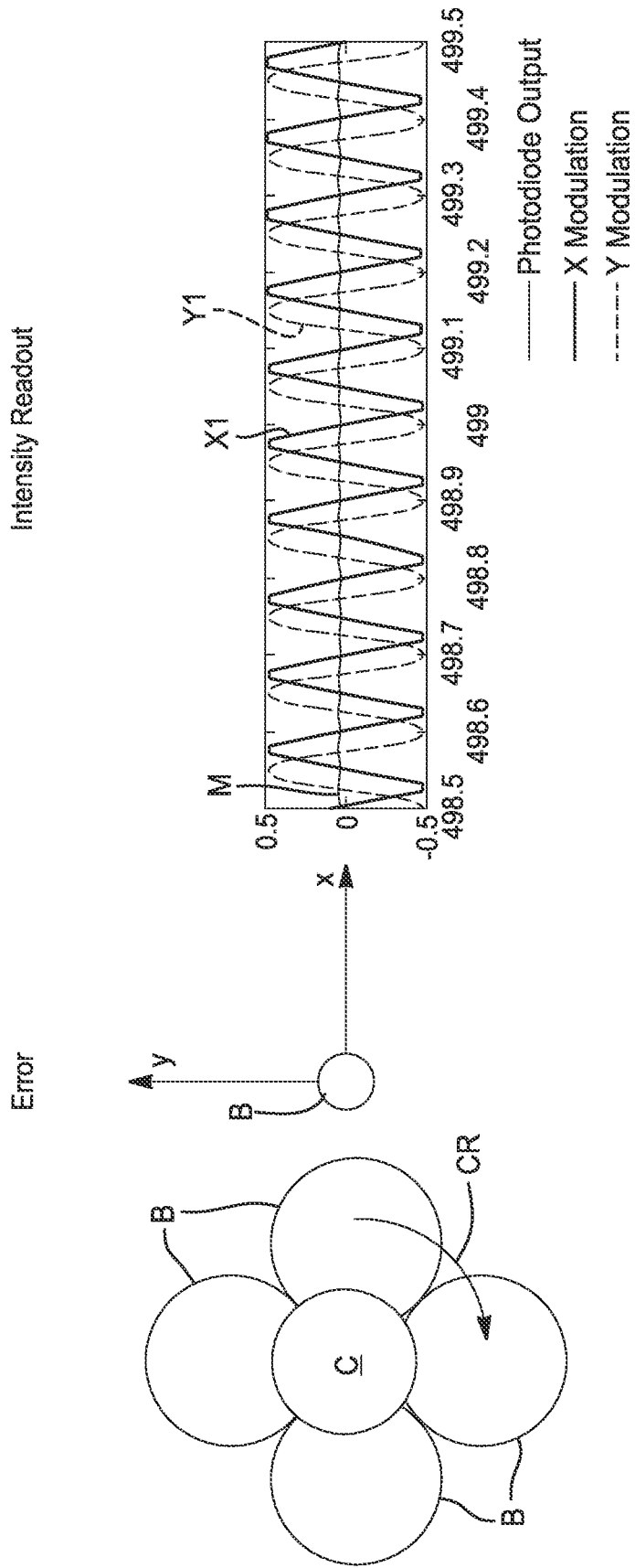
FIGS. 5a-5c illustrate performance of the spinning lock operation in achieving directional identification of a remote CAFSOC system unit, when the detector of one CAFSOC system unit is locked on to the incoming pulse signal of a remote CAFSOC system unit during the spinning lock operation.

At operation 204 System A emits timing pulses with a transmitted communications link. The transmitted beam is modulated to spin in a small circle whose angular radius is on the scale of the beam divergence. From the perspective of the emitter, the beam modulation is a slight circle around a particular angle. The emitter choses an arbitrary orientation in the modulation to be the reference angle, at which point the modulation rotation angle may perhaps be set to 0. A timing pulse is sent out when the beam is at that reference angle. The timing pulses may correspond to 0 degree reference in rotation. At operation 206 System A directs the emitted beam in a circular pattern, whose angular radius is small enough that the beam is consistently overlapping the center point of the circle. This is shown in FIG. 5a, where all of beams "B" have a small portion which equally, uniformly overlaps a center aim point "C" representing a single pixel of the detector 30, and wherein the center aim point in this example represents the exact vector along which a remote system CAFSOC system unit is transmitting its pulsed optical signal. The rotational frequency of the beam B may be a few kilohertz, but in a preferred implementation is about 20 KHz.

FIG. 5b shows the resulting scan area covered by the beams B centered over the intersection of the X and Y axes indicating no X or Y axis error. Thus, the circle formed by movement of the beams B is perfectly aligned along the vector from which the received pulsed optical signal is originating from. The graph of FIG. 5c shows the modulation intensity "M" of the output of a single photodiode (i.e., single pixel) of the detector 30, which is generally constant during this condition of perfect alignment. Waveforms X1 and Y1 in FIG. 5c show the positional modulation scale of the emitted signal from System A, which is constant while scanning the beam B1 in a circular pattern around the center aim point C. This circular scanning of the beam B in FIGS. 5a-8a is accomplished using the high speed modulation capabilities of the emitter beamsteering chip 34a1. In this example arrow "CR" indicates a clockwise rotation of the beam B in a circular pattern, although the rotation could just as easily be counter-clockwise.

Figures 8A, 8B, 8C:
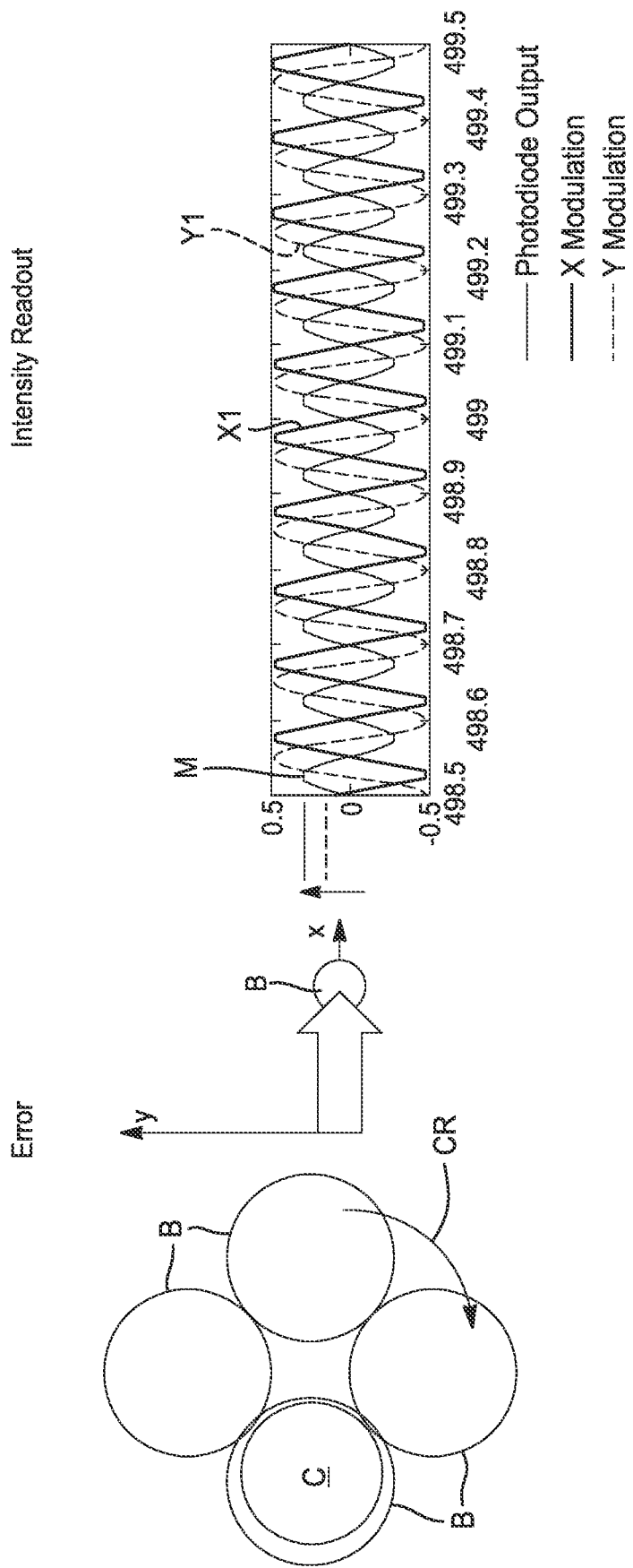
FIGS. 8a-8c illustrate how a magnitude of Y axis misalignment is revealed at the photodiode output of the receiving CAFSOC system unit.

With brief reference to FIGS. 6a-6c, FIG. 6a illustrates the shifting of the beam B occurring when there is an error along the X axis. The intensity M of the photodiode output in FIG. 6c indicates that the intensity of the received signal is varying significantly in a sinusoidal pattern as the beam B is scanned in a circular motion, due to the X-axis misalignment of the circularly scanned beam B. FIGS. 7a-7c illustrate the same type of error but only along the Y axis. Again, the modulation intensity M in FIG. 7c is varying in a sinusoidal pattern, but shifted 90" due to the Y-axis misalignment of the circularly scanned beam B. FIGS. 8a-8c illustrate a maximum degree of modulation intensity change as the error is along the X axis, and the scanned beam B fully overlaps the center aim point C. The phase shift of the modulated signal M (either leading or lagging waveforms X1 and Y1), as well as the magnitude and sign (positive or negative) of the detected signal, enables System A (and System B as well) to determine both the directional pointing vector error, as well as a magnitude error. This is a direct measure of the positional error in beam alignment to the detector 30. By feeding back the vector error along the communication channel, System B can pass System A everything System A needs to bring the emitted laser back into alignment with System B's detector. These two important features enable each of Systems A and B to quickly "home in" on a precise directional alignment vector of the other.

Returning to FIG. 4a, at operation 208 the communication from System A is transmitted via rapid (e.g., >>20 KHz) signal (modulated by one of intensity, wavelength or phase). At operation 210 System B records the incoming signal intensity, which will be varying at the spinning frequency, while also recording the communications signal (i.e., information contained in the received signal provided by System B). At operation 212, System B applies a frequency filter (e.g., performed in signal processing software) to the signal received off the detector sensor array 30a at a spinning frequency (e.g., 20 KHz) to lock on to this specific frequency. At operation 214, System B reads the time interval between timing pulse and sinusoid of the 20 KHz spinning signal on its detector 30 (i.e., phase delay). As explained above, the power modulation occurring due to the spinning lock operation when carried out by both units provides both System A and System B the information needed so that each maintains lock-on to the other.

Figure 4B:
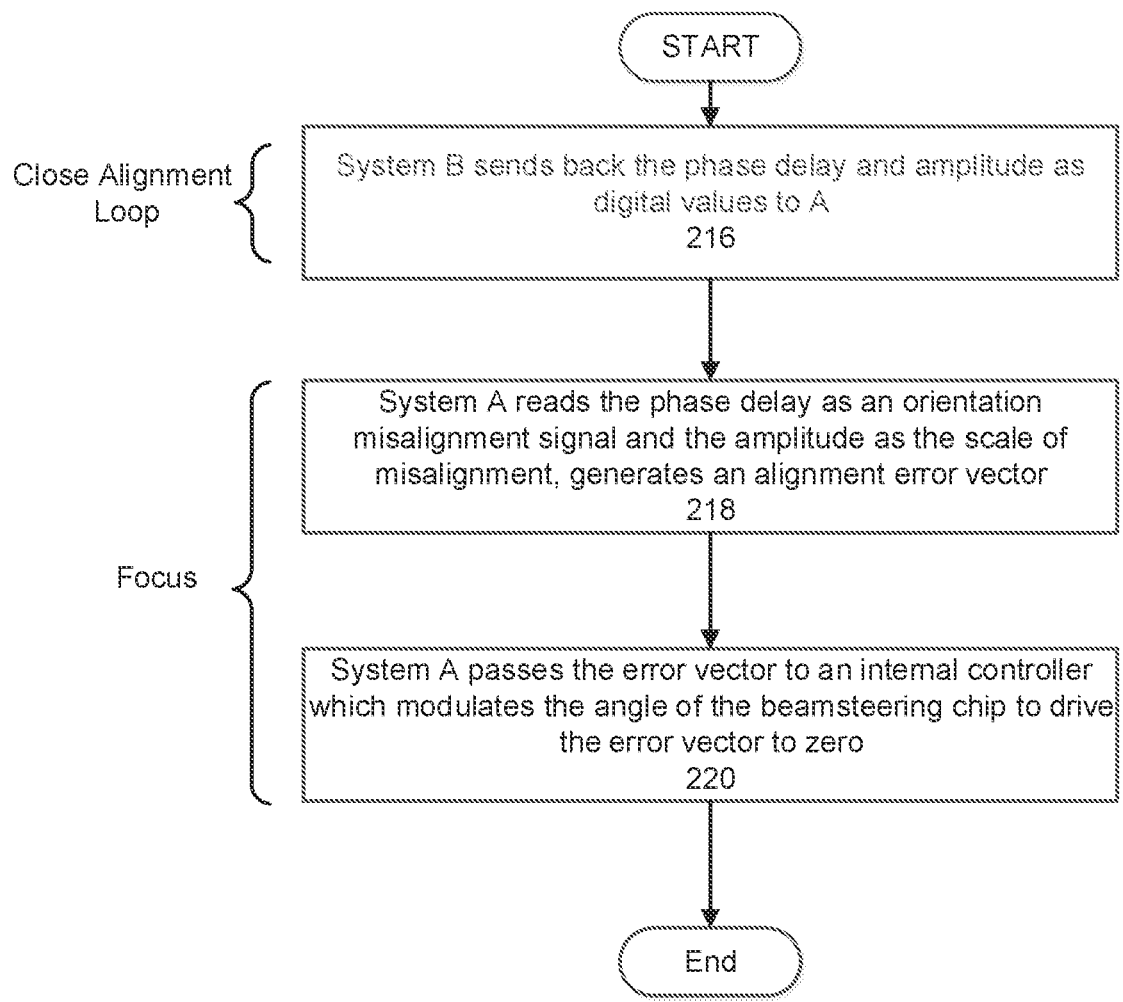

Referring to FIG. 4b, the close alignment loop operation may then be performed at operation 216. Operation 216 involves having System B send back the phase delay and amplitude as digital values to System A. This operation is done digitally, meaning the signal does not degrade with separation r. This compares favorably against standard techniques that call for an analog reflection to return to the emitter which degrades by $1/r^2$. Digitization avoids the standard communication challenges of the $1/r^4$ dropoff where the emitted signal drops by $1/r^2$ in reaching the target, then by $1/r^2$ in returning. This means that the laser power requirements for loop closure are significantly reduced.

With both the transmitter and receiver maintaining a spinning lock on each other, the link between the systems becomes highly resilient to orientation error signals with frequencies well below the spinning frequency (around 20 kHz), such as like platform motion, vibration, shock, etc. Motion in System A's platform will have a significantly more negative effect on System A's ability to point at B rather than vice versa due to the separation distance amplifying small platform angular variations into large positional errors. Sensor B's spinning lock on likely will not pick up small sub-beam divergence position changes characteristic of motion in System A's platform. Therefore, it is preferred to have each System able to rapidly counter motions occurring on its own platform. Either one or both of System A and B could pre-emptively apply counter motion commands to cancel onboard platform motion affecting its own system, that is sensed via onboard motion sensors (e.g., sensors 20 of FIG. 1 like gyros and accelerometers which sense one or more of roll, pitch and yaw movements of the mobile platform).

At operation 218 a "Focus" operation is then initiated which involves having the controller 12 of System A read the phase delay as an orientation misalignment signal, and the amplitude as the scale of misalignment, and to generate an alignment error vector. At operation 220 the controller 12 then uses this alignment error vector to modulate the angle of the beamsteering chip to drive the error vector to zero.

If the user is interested in operating the System A in a low visibility mode, then after making a communications connection, the emitter focusing control subsystem 22 (i.e., transmitter) and the detector focusing control subsystem 24 (i.e., the detector) could be controlled by the controller 12 to switch to utilizing an intermediate node. This mode will shift the two Systems A and B to point at a third party node, perhaps a road sign or rock, and reflect off that, knowing that the other system's detector will be looking there too. This would substantially reduce the power passed between units due to each System A and B incurring likely substantial beam spread losses by having the received signal reflected off an object. But the same diffuse reflection that incurs power losses also hides the receiver and transmitter, as the beam spreading hides the exact direction of both the transmitter and receiver. The intermediate node thus provides a shared communication point without forcing Systems A and B to directly laser illuminate one another.

The benefit of using the beamsteering chip 34b1 in controlling the receiving micromirror elements 34b of the DMM assembly 32 of the CAFSOC system 10 is the increased sensitivity to the incoming signal and the capability to reject signals coming from directions other than where the transmitting micromirror elements 34a are pointing at. The directionality makes the resulting communications link especially resilient to jamming efforts, which is of high value for defense applications and congested commercial environments such as autonomous vehicle communications.

The design of the CAFSOC system 10 could be made to cover a full 360° coverage region by arraying paired sets of transmit/receive apertures, each covering a part of the circle, (approximately 60° for the LDA design). Air-to-air network links could operate via arrays of the CAFSOC system 10 placed behind conformal windows around the fuselage of an aircraft. In cases where size is at a premium, such as for small drones, the CAFSOC system 10 can be mounted on low cost simple rotary platforms inside a softball sized package, or pointed at a small spinning mirror that allows the system to periodically view the full 360 degree surrounding scene. Such rotary platforms can be low-cost, low precision components, as the CAFSOC system 10 can easily compensate for dynamic issues in the platform rotation.

The array nature of the beamsteering chips 34a1 and 34b1 used by the CAFSOC system 10 units means that each CAFSOC system 10 could operate to either send out a single beam or split the beam between multiple targets as desired. The receiver of each CAFSOC system 10 could equally divide its aperture among a single or multiple other units. The single beam could be time shared over many targets if desired. The multiple beamsteering chips in a wraparound 360° design would provide another method for connecting to multiple targets in parallel. All of these options enable the CAFSOC system 10 units to operate as multi-connected nodes in an ad hoc network to ensure communications despite node failures or poor weather. A large network of low cost CAFSOC system 10 units driven by high-bandwidth precision beamsteering chips offers a new route to break the conventional paradigm of directional versus omnidirectional signal transmissions/receptions, and achieves the best of both types of systems: consistent signal lock with low power in all weather conditions, and with extremely low probability of detection or interception. The low-cost compact nature of the beamsteering chip architecture used in the CAFSOC system 10 enables wide deployment, so that the network can rely on many closely located nodes that can penetrate poor weather rather than on a few precious nodes separated by large distances.

The CAFSOC system 10 also compensates for, and cancels out, platform motion of the platform (e.g., vehicle) which it is being used with. By this it is meant that the CAFSOC system 10 can be controlled such that the pointing angle assigned to the emitter array 34a accounts for and cancels out motions of the platform, such that the laser default pointing angle remains largely constant as seen in the frame of view of the environment around the platform. It is important that the CAFSOC system 10 be able to maintain the orientation at the acquisition process. The adaptive compensation provided by the CAFSOC system 10 cancels out high frequency issues.

There are at least four major benefits to the CAFSOC technology; i) greater link reliability in rough environmental conditions, ii) reduced laser power demand due to improved beam pointing, iii) order-of-magnitude reduction in size weight and power (SWaP) than the existing mirror technologies, all at significantly lower cost. Compact low-cost LDA-enabled FSOC offers a means to achieve widely deployable reliable, jamming-resistant, stealthy (LPI/LPD) navigation and communications network links; and iv) the use of only one laser for both determining the precise aiming direction needed to communicate with a remote CAFSOC system 10 unit, as well as to pass data and information on to the other CAFSOC system unit.

Greater link reliability in adverse environmental conditions: The large range and high precision enabled by a beamsteering chip enable it to hold link even on mobile platforms including vehicles, aircraft, ships and personnel. These conditions include turbulence, shock, acceleration, thermal variation and vibration. The CAFSOC system 10 can thus be widely deployed and trusted to work reliably throughout the full scale of mobile operation whether on the ground, in the air or in space.

Reduced laser power demand due to improved beam pointing: The integral feedback control on the mirrors of the enable them to operate with about 10× less jitter than previous state of the art systems owing to the equivalent increase in control bandwidth. The laser power requirements for communication scales by the square of the jitter, owing to the smearing of the beam over the downstream target. A reduction in jitter will have a significant squared effect on driving down the required laser power, which plays a large role in the SWaP as well as cost of the CAFSOC system 10 unit.

Order-of-magnitude reduction in size weight and power (SWaP): The beamsteering chip replaces the steering mirror and gimbal setup used in present state-of-the-art systems with a single mass produced IC-microfabricated chip. This replacement removes the other main driver of SWaP and cost for FSOCs. Beam steering gimbal systems are generally custom assembled, high-mass and low-speed and have significant dynamic issues. The beamsteering chips 34a1 and 34b1 replace these with mass-manufactured chip-scale components (or one single component including the capability of both beamsteering chips 34a1 and 34b1) which has significantly reduced mass, higher speed, and improved dynamics.

The jitter reduction and gimbal replacement advantages combine to offer a route to achieve low-cost FSOC. Low-cost and small SWaP enables wide deployment. Wide, dense (order 1 km separation) deployment of small FSOC links provides an approach to ensure network reliability even in adverse conditions including poor weather. High performance gimballed FSOC units as developed in specialized programs can cost well above $100 k (dominated by the manually assembled beam steering system), and still place significant restrictions on motion/maneuvering in order to guarantee link reliability. A CAFSOC can replace these with a $10-100 chip that does not restrict maneuverability owing to a 100× increase in bandwidth. The jitter reduction (10×) also drives down laser power demands, allowing for further significant reductions in FSOC cost by shrinking the laser. The combined replacement of gimbal and reduction in jitter can remove the two main drivers of SWaP and cost, providing a means to reach handheld systems with cost on the scale of $10's-$1000's.

Figure 9:
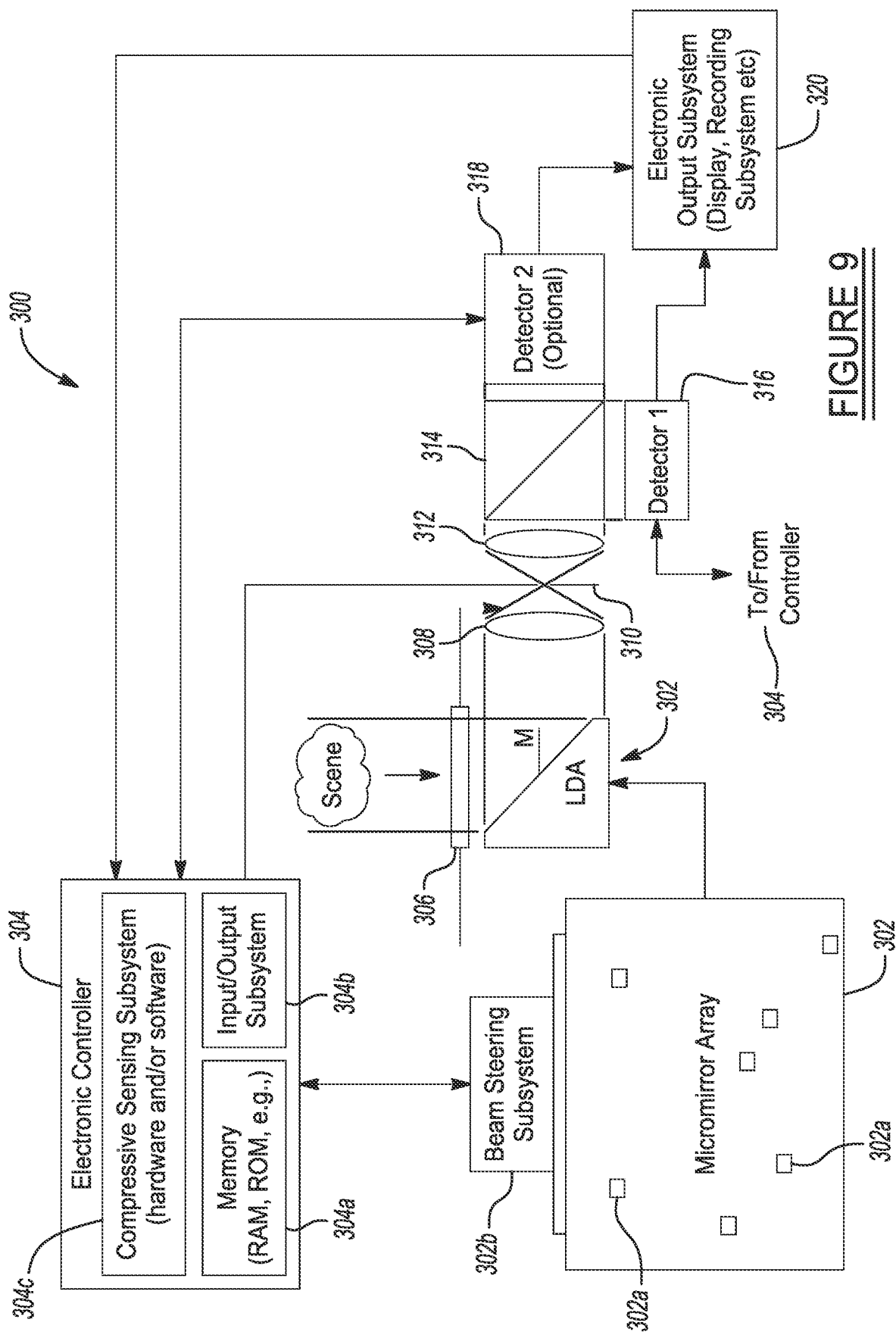
FIG. 9 is a high level block diagram illustration of another embodiment of the present disclosure which forms a real time, compact, adaptive compressive optical sensing system for capturing high resolution, real time areal images.

Referring to FIG. 9, another embodiment of the present disclosure is presented which relates to an adaptive, free space, gimbal-less optical imaging system 300. In summary, the system 300 makes use of certain of the receiver componentry of the system 10 but with important differences in the sensor section. Rather than linking between pairs of equivalent laser communication units, the system 300 adapts the receiver componentry for capturing optical information from a real time image of an object or scene.

In FIG. 9 the system 300 can be seen in this example to include a digital micromirror array 302 having a plurality of independent micromirror elements 302a. The precise plurality of micromirror elements 302a used may vary to meet the needs of a specific application, but it is expected that for many commercial applications, hundreds of micromirror elements 302a will be used to form the micromirror array 302. The micromirror elements 302a can each be independently tilted or tipped (e.g., "steered") to a desired angle in accordance with suitable scanning control signals from an electronic controller 304. A beam steering subsystem (e.g., integrated circuit chip) 302b may be fabricated as an integral portion of the micromirror array 302 for generating micromirror tilt signals in response to the scanning control signals received from the electronic controller 304. In this example the micromirror array 302 may be the Lightfield Directing Array described above, which has been developed by the assignee of the present disclosure.

The controller 304 may include memory 304a (e.g., RAM, ROM, etc.) as well as an input/output subsystem 304b, which applies real time scanning control signals to the micromirror array 302 which the beam steering subsystem can use to determine the needed tilt control signals needed to aim each of the micromirror elements 302a as needed to image a desired scene. The micromirror array 302, with its large angle tip/tilt capability and position sensing incorporated into each micromirror element 302a, provides a means to achieve all necessary performance metrics for providing high resolution areal images, and without the drawbacks attendant to a gimbal-mounted mirror system.

The system 300 of FIG. 9 further may include a window or aperture through which the image can enter the device 306, a first focusing lens 308, an electronically controlled aperture control subsystem 310, and a second focusing lens 312. In one embodiment the aperture control subsystem 310 may comprise an electronically controlled dynamic field stop subsystem. Merely for convenience, the following discussion will reference the electronically controlled aperture control subsystem 310 simply as the "dynamic field stop 310". It will be appreciated, however, that MEMS or transmissive media approaches all fundamentally form "dynamic field stops" (i.e., device which modulates the acceptance angle and change the field stop size). A field stop may thus be understood, in a broad sense, as a device or system which sets the limiting aperture defining the angular range of acceptance for viewing, which is what the aperture control subsystem 310 operates to do.

The system 300 may also include a beamsplitter or optical filter 314 (referred to throughout the following discussion for simplicity as "beamsplitter" 314), and at least one detector 316. Optionally, more than one detector may be used, as in the drawings where a second detector 318 is included. If two detectors 316 and 318 used, then the detectors may be arranged to receive two distinct spectral outputs from the beamsplitter 314. For example, the outputs generated by the beamsplitter 314 may be selected based on predetermined wavelength bands (e.g., 800 nm-900 nm for the detector 316 and 900 nm-1000 nm for the detector 318). The detectors 316 and 318 may each be a single optical sensor (e.g., photodiode) or they may each comprise a plurality of optical sensors, for example a plurality of photodiodes or camera chips (CCD, CMOS, or other FPAs). The detectors 316 and 318 may optionally provide signals to an additional electronic output monitoring subsystem 320, which may comprise a display device (LCD, LED, CRT, etc.) or an electronic recording subsystem for recording electronic (e.g., digital) data collected by the detectors 316 and 320. Optionally, the electronic subsystem 320 may be in communication with the electronic controller 304 to enable the electronic controller to obtain collected data sensed by the detectors 316 and 318.

In operation, the electronic controller 304 of the system 300 supplies control signals to the micromirror array 302 to scan the micromirror array 302 over a desired field. By "scan" it is meant the angle of each one of the micromirror elements 302a is adjusted to different positions over time so that the micromirror array 302 is able to receive light from an areal scene being imaged. The commands may be to keep all the micromirror elements 302a in the micromirror array 302 operating synchronously or to have micromirrors 302a receiving different commands from one another so the array points in multiple directions simultaneously. The micromirror array 302 passes the captured light incident upon it through the focusing lens 308 to the dynamic field stop 310. The dynamic field stop 310 controls the acceptance angle of the received light and passes a select subportion of the received light to the focusing lens 312, which it passes it to the beamsplitter 314. The beamsplitter 314 then passes the light to the detector 316 and optionally to the detector 318.

One or more optical sensors can be used in each detector 316 and 318 to measure the captured light. If one sensor is used, for example in the first detector 316, then the micromirror array 302 will be able to capture one pixel at a time. If multiple sensors are used in the detector 316, then this number can be increased (e.g., two or more pixels worth of light can be captured at a time). The same applies to the light collecting ability of the second detector 318. One preferred mode is to have a sensor array in each detector 316 and 318 that provides one or more sensors per micromirror element 302a. In this case, the light passed from each micromirror element 302a can be measured independently. This allows the image collection process to be parallelized where each micromirror element 302a is capturing potentially a different section of the incoming light. This speeds up the image capture process, but with the tradeoff of reduced aperture and light collection for each pixel.

The system 300 provides the benefit that the micromirror array 302, in combination with control over the dynamic field stop 310, enables the system to be rapidly adapted as needed to maximize sensitivity in low light conditions or image capture rate in higher light conditions. The upper limit of image resolution for explicitly scanned imaging operation is a function of the spatial resolution of the sensing array, as represented by the overall number of sensors used in each detector system 316 and 318, in combination with the discretization of tip/tilt position control and the field stop size (or effective focal width in relation to the field stop).

The operation of the dynamic field stop 310 is important in that it forms an aperture which sets the acceptance angle of light captured and reflected by the micromirror array 302. A small acceptance angle will represent a narrow cone of light rays emanating almost horizontally from an elevational midpoint "M" of the micromirror array 302 in the drawing of FIG. 9, while a large acceptance angle will encompass light rays from a much larger cone emanating from the micromirror array 302 which diverge substantially from the midpoint "M" horizontal axis. Accordingly, if the aperture of the dynamic field stop 310 is very small, then only light from a very small cone off the micromirror array 302 can pass through the dynamic field stop and make it to the sensor(s) of one or the other of the detectors 316 or 318. If the aperture formed by the dynamic field stop 310 is widened, then the acceptance angle for each micromirror element 302a is increased. "Acceptance angle" is defined for each micromirror element 302a as the range of possible angles of incoming light that will reflect off the given micromirror element 302a and still pass through the field stop to be captured by the detector system 316 and 318. This sets the angle of light which will contribute to the detector reading for any given measurement and thus the effective pixel size during image capture.

In practical applications of the system 300 it may be useful to dynamically change the acceptance angle during operation. For example, it may be helpful to collect more light and rougher images initially during a first scan of a scene, and then refine the pixel resolution and recapture an image only in a subarea of interest of the scene while performing a second scan. The system 300, being an adaptive system, is able to carry out such changes "on the fly" as image information is being scanned and collected.

The above described dynamic field stop 310 widening can be performed in several ways. One option is to use a dynamic field stop as described above for the CAFSOC system 10. This could be generated in the same way as described above for the dynamically variable field stop 31c2 discussed above. Alternatively, a MEMS shutter system or a variably controlled transmissive media could form the needed design. The MEMS shutter system could work in a reflective mode, where the focused beam is bounced off a small array of reflective mirrors. In this case, the array should be made with the smallest pitch possible, like the Texas Instruments DMD design which has approximately 10 µm pitch. When the mirrors are flipped to one orientation then the light will reflect off the MEMS shutter and pass to the detector. But when the mirrors are flipped to another orientation, the light is rejected and does not reach the detector. The MEMS shutter array could then change the effective size of the aperture dynamically by flipping mirrors to determine the shape and extent of the field stop. Alternately a controlled transmissive media approach would work by using an optical element which would have an array of transmissive pixels whose transmissivity could be controllably changed, like a liquid crystal display. Such a device would be put at the plane of the focused beam 310, then the transmissivity adjusted dynamically to form a transmissive field stop of the desired shape and extent. Still another option is a dynamic curvature approach that uses a reflective optical surface or variable optical phased array which can control its curvature (or effective curvature) to set a focal length that could be placed at a conjugate plane to the micromirror array 302. When curvature is applied to the dynamic focal length device, it changes and widens the angle of acceptance for each micromirror element 302a of the micromirror array 302, essentially adding a varying tip/tilt offset to each micromirror element 302a. This can be visualized by imagining superimposing the curvature of the dynamic focal length device onto the micromirror elements. Such superposition is a useful approximation since the elements are in conjugate planes and so appear to stack their effects. The curvature of the dynamic focal length device within each micromirror element would make the element appear to have a 'fish-eye' like lens and widen the acceptance angle. The tip/tilt angle of the dynamic focal length device at the center of each micromirror element can be interpreted as a tip/tilt offset to the mirror orientation. The tip/tilt offset effect could be removed by suitable adjustment of the orientation for each micromirror element, leaving only the acceptance angle widening effect. This widens the area of light capture for the whole array, but reduces the effective aperture for any given angle. So the system 300 with a dynamic curvature approach can scan a larger area, but at lower sensitivity to light owing to the reduced effective aperture. Comparatively, the dynamic field stop approach retains the full effective aperture width even while increasing the angle of acceptance. This means that the dynamic field stop approach retains maximum light sensitivity.

Still further, instead of having an additional dedicated focal control device, a tip/tilt/piston bias that provides an effective focus offset can be placed on each of the microelements 302a within the array to widen the field of regard. In this case, the micromirror array elements now each point in slightly different directions from one another. Instead of steering all to the same angle, they are distributed to cover many different angles. This is the equivalent of putting a discretized 'curvature' onto the mirror. Rather than acting like a flat steering mirror, the micromirror array surface is now given a slight curvature and will then capture light from a wide range of angles. This is similar to the dynamic curvature approach but adds the focus function to the micromirror array 302, potentially with some compromise to individual element dynamic range but with the added benefit of a simpler integrated system. In all cases, the system 300 will be able to capture a larger solid angle, and thus scan an area or scene more rapidly.

It is expected that compressive sensing techniques may be employed with the system 300. Thus, the system 300 may also optionally include a compressive sensing subsystem (hardware and software) 304c, as shown in FIG. 9. The compressive sensing subsystem 304c may be included as a component of the electronic controller 304 or optionally may form a fully separate subsystem which communicates with the electronic controller 304. The compressive sensing subsystem 304c uses a limited sampling of the image (i.e., scene) of interest, meaning pixels from throughout the image. Compressive sensing algorithms included in the compressive sensing subsystem 304c can then be used to regenerate a rough estimate of the image from the information provided by the selected pixels. The number of pixels used (i.e., subset of all the available pixels) can be upwards of an order of magnitude less than the full number of samples. This allows for images to be generated well before all of the image area is sampled. This technique thus trades resolution for speed in the imaging process. The system 300 and its micromirror array 302 is well suited to this approach as the array and detectors can be used to rapidly and controllably capture a subset of pixels from the full image in arbitrary order. This subset of pixels collected information from the limited number of micromirror elements 302a used is then fed into a suitable compressive sensing algorithm and used to generate rough low resolution images. The compressive sensing subsystem 304c may include its own embedded logic, for example a dedicated microprocessor, field-programmable gate array, or application specific integrated circuit, which adds some latency and complexity, but the savings afforded in scanning timelines compared to an explicitly steered approach can be substantial. The user or additional image processing algorithms built into the embedded logic can be used to identify areas of interest within the imagery. The adaptive micromirror array 302 can be focused on these areas of interest by the electronic controller 302 (or optionally by the compressive sensing subsystem 304c) and repeat the sensing image capture but this time at higher resolution if operating in an explicitly controlled mode. The resolution of the image is ultimately set by the micromirror 302a angular resolution and the dynamic field stop 310, not pixel pitch as is typical for digital cameras. Because of this feature, the system 300 can zoom and focus on a small subportion of interest of a much larger scene.

When using compressive sampling, the sampling of points can be either random or pseudorandom. Pseudorandom sampling can more rapidly build up the image by ensuring a good distribution over the image. Random sampling is slower to build up an image, but can be achieved by random motion of each micromirror element 302a in the micromirror array 302. The exact angle of the micromirrors 302a must be known via position sensing on each micromirror element 302a. If the angle is known, it can be varied nearly randomly to sample over the full image, then compressive algorithms can be used to slowly recreate the image. This allows for possibly uncontrolled motion at the micromirror elements 302a to be used to create the image. In such a case, the micromirror elements 302a do not need to be operating in a closed loop configuration to reject disturbances and random motions; disturbances and random motions are acceptable from a compressive imaging perspective.

The system 300 enables compact image sensing with a large effective aperture that can operate stably in high mechanical noise environments. For explicitly steered systems, the use of the micromirror array 302 enables individual, closed-loop tip/tilt control of each micromirror element 302a, which in turn enables full spatial sampling of a two-dimensional space. The system 300, which thus provides an explicitly steered system, also potentially allows for a higher fidelity imaging mode within a specific portion of the entire effective field-of-view of the sensor. For systems intended to operate via a compressive sensing approach, the micromirror elements 302a in the array 302 do not require individual control and can instead be agitated in aggregate using platform vibration or in-situ vibration devices (e.g., piezo-disks). The compressive sensing system approach thus significantly reduces the complexity and cost of the micromirror array design at the expense of the post-processing required to generate imagery from a sparse frequency data set, and the inability to operate in a high fidelity mode.

Figure 10:
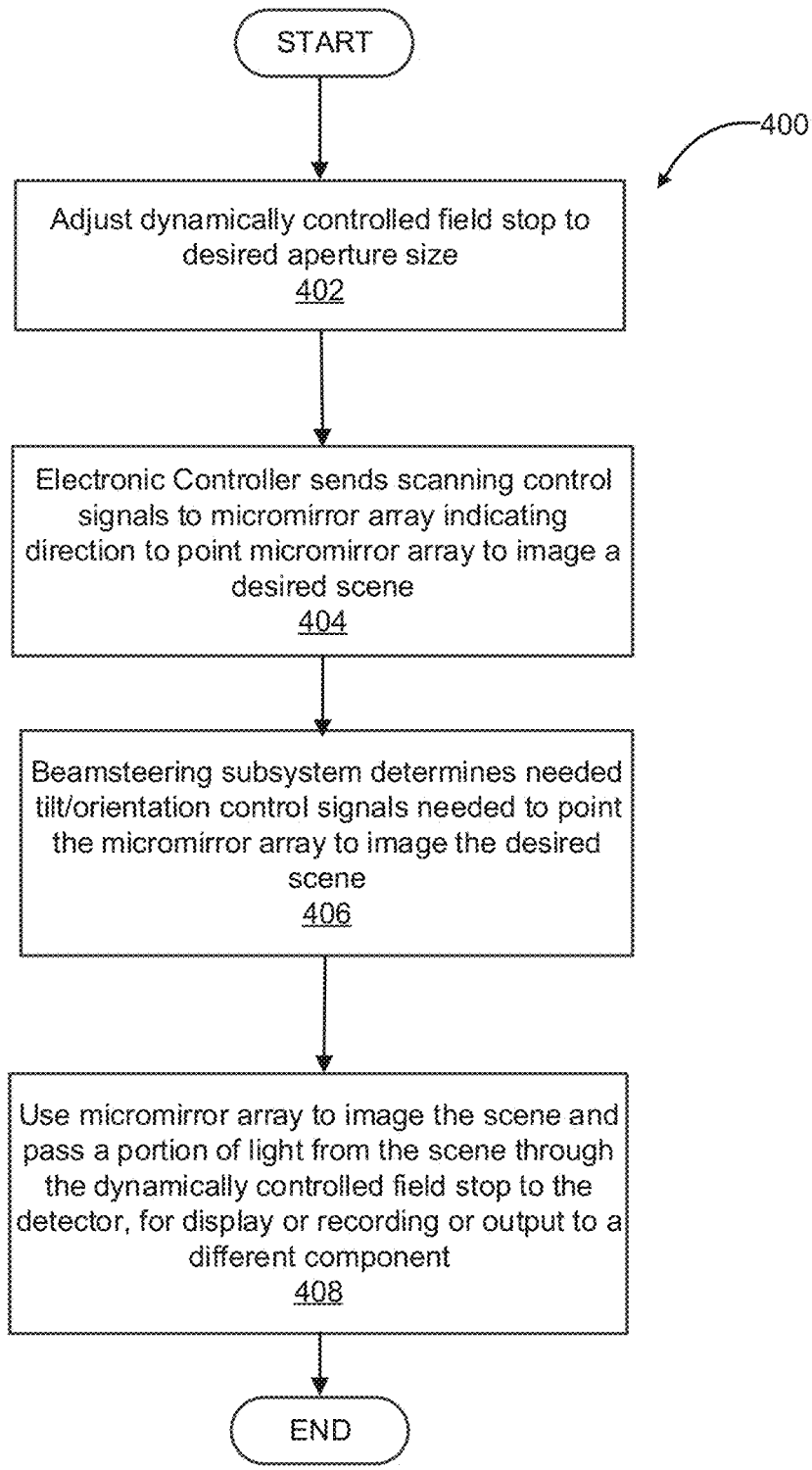
FIG. 10 is a high level flowchart of one example of various operations that may be performed by the system of FIG. 9.

Referring briefly to FIG. 10, a flowchart 400 shows one example of various operations that may be performed by the system 300. At operation 402 the dynamically controlled field stop 310 may be adjusted to a desired aperture size. At operation 404 the electronic controller 304 may send scanning control signals to the micromirror array 302 which indicated a desired pointing direction that the micromirror array 302 is to point to in order to image a desired scene. At operation 406 the beam steering subsystem 302b determines the needed degree and orientation of tilt to be applied to each of the micromirror elements 302a of the micromirror array 302 to be able to image the desired scene. At operation 408 the micromirror array 302 images the scene and a subportion of the light from the scene passes through the dynamic field stop 310 to the detector 316 where it is either displayed on the electronic output subsystem 320, or recorded, or passed back to the electronic controller 304 or to a different electronic component or subsystem.

The system 300 thus enables light from a scene to be captured either through an explicit scanning methodology, for example raster scanning, similar to traditional mosaic composite imagery, or via a compressive sensing approach where data is collected in a pseudorandom fashion. The system 300 provides a robust means to provide gimbal-less imaging even in high mechanical noise environments, and yet still meets SWaP constraints for many challenging implementations.

The system 300 is expected to find utility in a wide range of applications where it is important to detect and pinpoint, in real time, light within a scene being imaged, and to identify spectral information pertaining to the light collected from a scene. A compressive multi-spectral solid-state imaging system can be useful as a sensor in autonomous vehicles to better understand their surroundings by seeing through poor weather or ensuring returns off low-reflectivity objects. This system does not replace cameras but rather supplements them to ensure image capture can be carried out in conditions where cameras would have difficulty operating such as bumpy roads. Such challenging implementations may include one or more of assisting in drone navigation or other autonomous system environmental mapping or sensing operations.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An imaging system, comprising:
   an electronic controller;
   a digital micromirror array including a beam steering subsystem forming a portion thereof and being configured to image a scene, the digital micromirror including a plurality of micromirror elements responsive to control signals generated by the electronic controller, the control signals being used by the beam steering subsystem to electronically aim the micromirror elements in a desired direction to image a desired area, and for receiving and reflecting light emanating from the desired area;
   an aperture control system configured to receive light reflected from the digital micromirror array and to pass a predetermined subportion of the received light therethrough; and
   a detector responsive to the predetermined subportion of the received light.

2. The system of claim 1, wherein the beam steering subsystem of the digital micromirror array includes an integrated beam steering subsystem.

3. The system of claim 2, wherein a position of each of the micromirror elements is independently controllable using mirror tilt signals generated by the beam steering subsystem.

4. The system of claim 1, wherein the aperture control system comprises an electronically controlled, dynamic field stop subsystem.

5. The system of claim 1, wherein the aperture control system comprises a micro electromechanical mechanical shutter system.

6. The system of claim 1, wherein the aperture control system comprises a variable controlled transmissive media.

7. The system of claim 1, further comprising a beamsplitter configured to receive the predetermined subportion of the received light and to pass a portion of the predetermined subportion of the received light to the detector.

8. The system of claim 7, further comprising an additional detector disposed to receive the predetermined subportion of the received light and to pass a different portion of the predetermined subportion of the received light to the additional detector.

9. The system of claim 1, further comprising an electronic output subsystem for collecting data generated by the detector.

10. The system of claim 9, wherein the electronic output subsystem comprises a display device.

11. The system of claim 10, wherein the display device comprises at least one of: a liquid crystal display device, a light emitting diode display device and a cathode ray tube display device.

12. The system of claim 1, further comprising at least one lens for assisting in focusing the light reflected from the digital micromirror array prior to the reflected light reaching the aperture control system.

13. The system of claim 1, further comprising a compressive sensing subsystem operably associated with the electronic controller for controlling acquisition and processing of image information collected from the desired area, to reduce a time required to image the desired area.

14. An imaging system, comprising:
an electronic controller;
a digital micromirror array responsive to scanning control signals from the electronic controller and configured to image a scene, the digital micromirror including a beam steering circuit forming a portion thereof, and a plurality of independently controllable micromirror elements responsive to micromirror tilt control signals generated by the beam steering circuit, which control the micromirror elements to electronically aim the micromirror elements in a desired direction to image a desired area, and to receive and reflect light emanating from the desired area;
an electronically controlled dynamic field stop system responsive to the electronic controller and configured to receive light reflected from the digital micromirror array and to present an aperture of a predetermined dimension to enable passing of only a predetermined subportion of the received light therethrough; and
a detector responsive to the predetermined subportion of light.

15. The system of claim 14, further comprising a beamsplitter responsive to the predetermined subportion of the received light, for passing only a subportion of the predetermined subportion of light to the detector.

16. The system of claim 15, further comprising an additional detector disposed downstream of the beamsplitter, for detecting a different subportion of the predetermined subportion of light passing through the beamsplitter.

17. The system of claim 14, further comprising an electronic output subsystem for collecting an output from the detector, the electronic output subsystem including at least one of:
a liquid crystal display device;
a light emitting diode display device;
a cathode ray tube display device; and
a data collecting device.

18. A method for imaging a scene, comprising:
providing an electronic controller;
using a digital micromirror array including a beam steering subsystem forming a portion thereof and a plurality of tiltable micromirror elements responsive to control signals generated by the electronic controller, wherein the control signals used by the beam steering subsystem help to electronically aim the micromirror elements in a desired direction to image the scene so as to receive and reflect light emanating from the scene;
using an aperture control system configured to receive light reflected from the digital micromirror array and to pass a predetermined subportion of the received light therethrough; and
using a detector responsive to the predetermined subportion of light to detect information about the scene from the predetermined subportion of light.

19. The method of claim 18, wherein using an aperture control system comprises using an electronically controlled dynamic field stop.

20. The method of claim 18, further comprising using a beam splitter to receive the predetermined subportion of the received light, and to further limit passage of only a subportion of the predetermined subportion of the received light to the detector.

* * * * *